United States Patent
Sorenson et al.

(10) Patent No.: US 9,072,410 B2
(45) Date of Patent: Jul. 7, 2015

(54) SPATULA FOR CYLINDRICAL CONTAINER

(76) Inventors: Paul Sorenson, Smithfield, UT (US);
Lee K. Reeder, Draper, UT (US)

( * ) Notice: Subject to any disclaimer, the term of this patent is extended or adjusted under 35 U.S.C. 154(b) by 118 days.

(21) Appl. No.: 13/605,815

(22) Filed: Sep. 6, 2012

(65) Prior Publication Data

US 2013/0055519 A1  Mar. 7, 2013

Related U.S. Application Data

(60) Provisional application No. 61/531,920, filed on Sep. 7, 2011.

(51) Int. Cl.
*A47J 43/28* (2006.01)

(52) U.S. Cl.
CPC .......... *A47J 43/288* (2013.01); *Y10T 29/49826* (2015.01)

(58) Field of Classification Search
None
See application file for complete search history.

(56) References Cited

U.S. PATENT DOCUMENTS

| | | | |
|---|---|---|---|
| 1,498,509 A * | 6/1924 | Arnold | 416/71 |
| 2,828,502 A | 8/1959 | Tupper | |
| 2,900,656 A | 8/1959 | Tupper | |
| 4,987,635 A | 1/1991 | Young | |
| 5,491,868 A | 2/1996 | Baggenstos | |
| 7,603,740 B2 | 10/2009 | Goldsberry | |
| 7,788,760 B2 | 9/2010 | Schneble | |
| 2004/0231087 A1 | 11/2004 | Siegel et al. | |
| 2011/0191974 A1 | 8/2011 | Holcomb et al. | |

FOREIGN PATENT DOCUMENTS

FR   2682026 A1 * 4/1993 ............. A47J 43/28

* cited by examiner

*Primary Examiner* — Monica Carter
*Assistant Examiner* — Stephanie Berry
(74) *Attorney, Agent, or Firm* — Maschoff Brennan

(57) ABSTRACT

An embodiment includes a spatula with a handle and a blade. The blade includes a first blade end, an interior rigid section, a flexible straight edge, and two flexible opposing edges. At the first blade end, the blade is attached to the handle. The interior rigid section extends from the first blade end and has a substantially rectangular transverse profile. The flexible straight edge is located along the second blade end positioned opposite the first blade end. The two flexible opposing edges are substantially perpendicular to the first blade end and the second blade end and are curved in opposing directions. The interior rigid section encompasses a portion of the blade between the first blade end and the flexible straight edge and between the two flexible opposing edges. The flexible straight edge and the two flexible opposing edges deform under less stress than the interior rigid section.

19 Claims, 6 Drawing Sheets

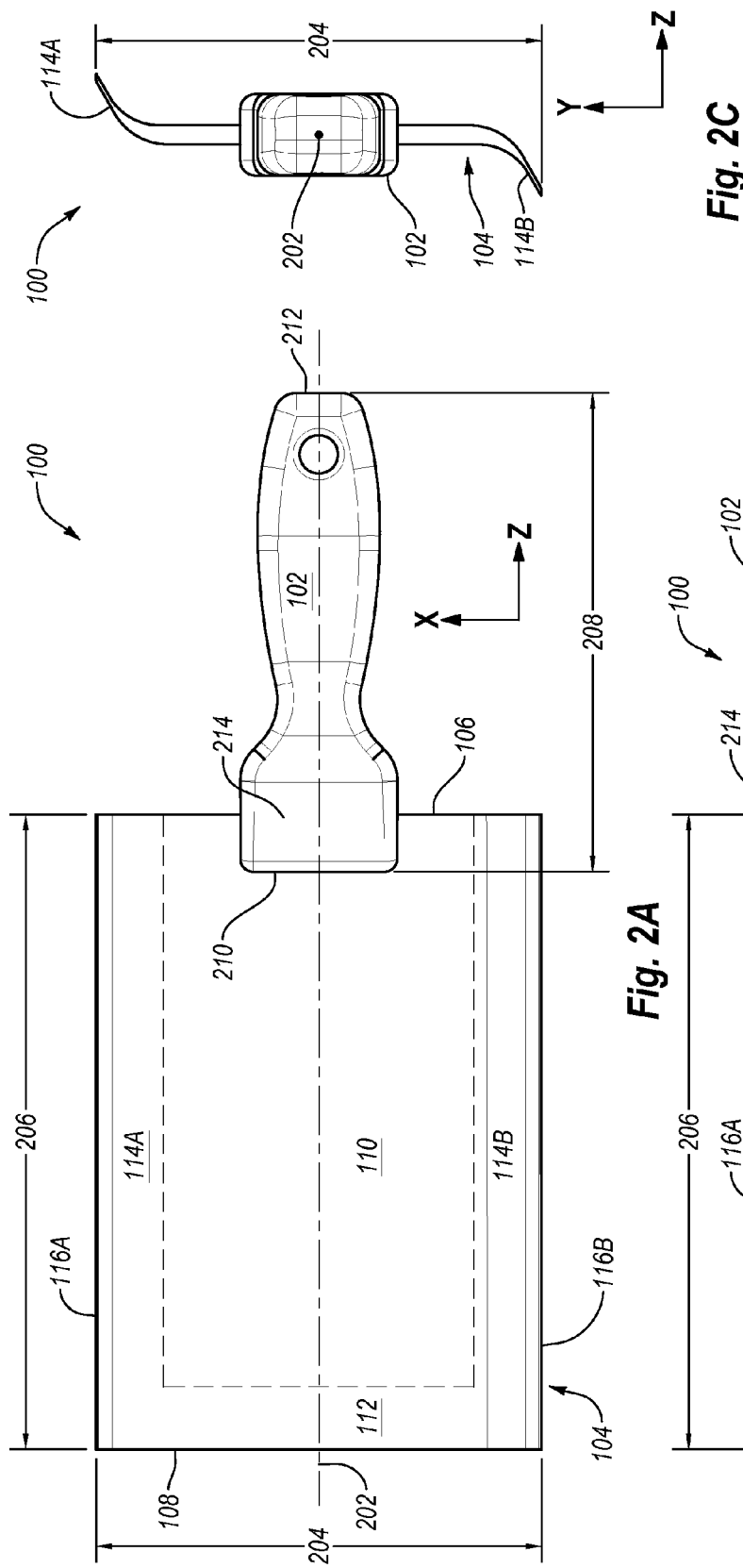
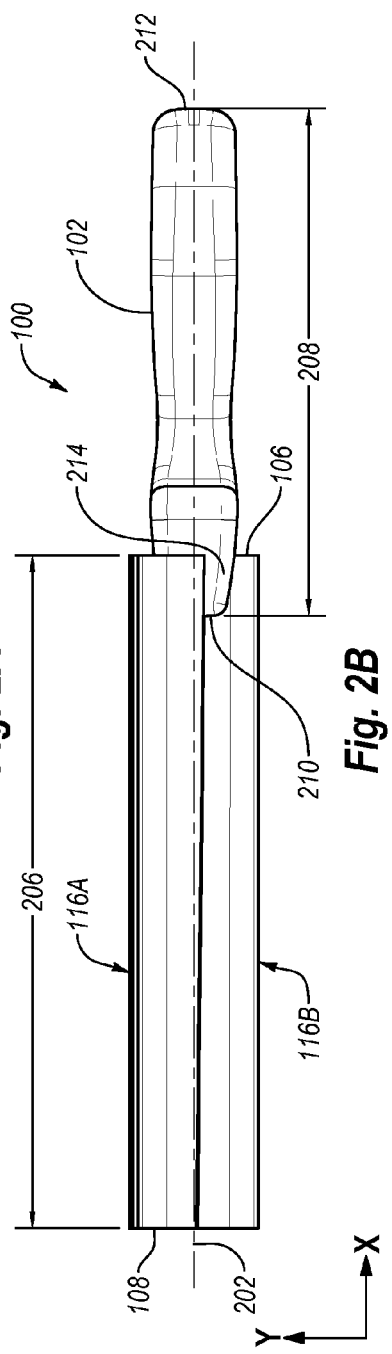
Fig. 2A
Fig. 2B
Fig. 2C

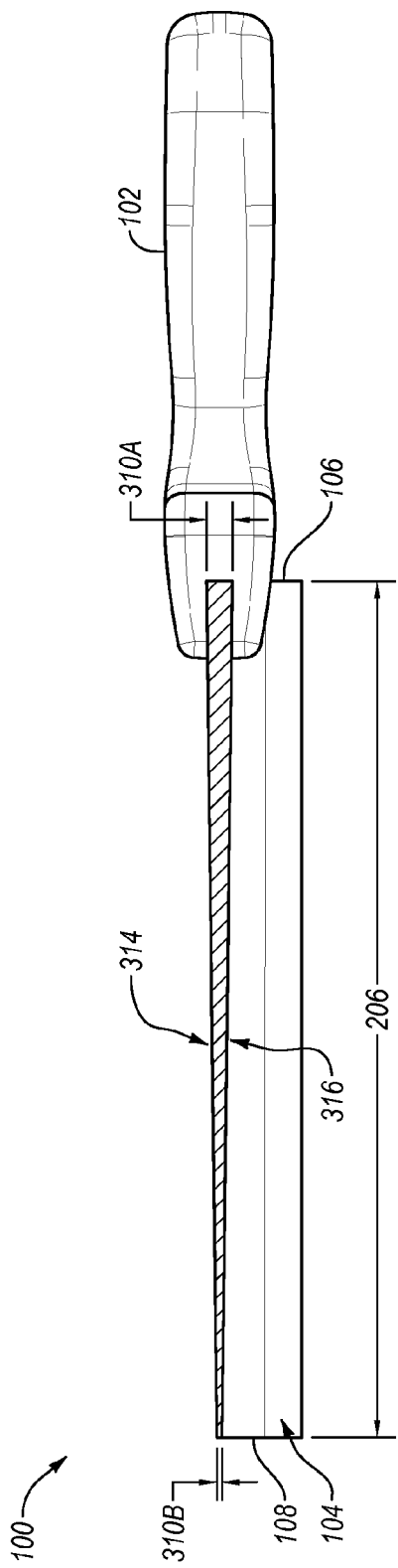
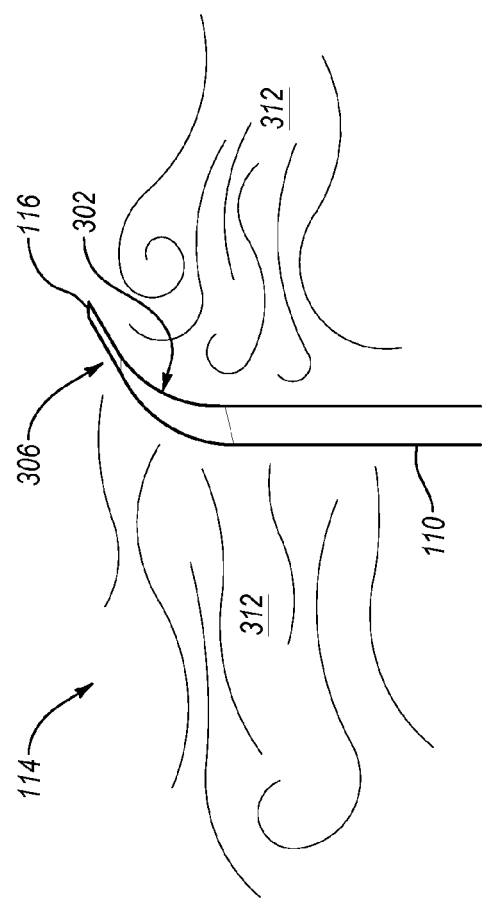
Fig. 3A
Fig. 3B

SPATULA FOR CYLINDRICAL CONTAINER

CROSS-REFERENCE TO RELATED APPLICATIONS

This patent application claims priority to U.S. Provisional Application No. 61/531,920 filed on Sep. 7, 2011, which is incorporated herein by reference in its entirety.

FIELD

Some embodiments described herein relate to spatulas. More particularly, some example embodiments relate to spatulas configured to remove product from a cylindrical container.

BACKGROUND

Products such as food or other substances may be stored in containers to preserve the product and/or to increase mobility of the product. Some containers may be constructed to fit a standard size. For example, the No. 300 Cylinder includes dimensions of 300×509, which indicate that the No. 300 Cylinder includes a diameter of 3 inches and a height of 5 and 9/16 inches.

While standard containers have increased normalization, removal of the product from the containers may be difficult. Removal of the product from the container may be particularly difficult when the product is thick, sticky, or otherwise adheres to the container, resulting in increased time to remove the product. Furthermore, failure to remove all of the product from the container leads to waste of the product.

The subject matter claimed herein is not limited to embodiments that solve any disadvantages or that operate only in environments such as those described above. Rather, this background is only provided to illustrate one example technology area where some embodiments described herein may be practiced.

SUMMARY

The object and advantages of the embodiments will be realized and achieved at least by the elements, features, and combinations particularly pointed out in the claims.

An embodiment includes a spatula with a handle and a blade. The blade includes a first blade end, an interior rigid section, a flexible straight edge, and two flexible opposing edges. At the first blade end, the blade is attached to the handle. The interior rigid section extends from the first blade end and has a substantially rectangular transverse profile. The flexible straight edge is located along the second blade end positioned opposite the first blade end. The two flexible opposing edges are substantially perpendicular to the first blade end and the second blade end and are curved in opposing directions. The interior rigid section encompasses a portion of the blade between the first blade end and the flexible straight edge and between the two flexible opposing edges. The flexible straight edge and the two flexible opposing edges have properties such that they deform under less stress than the interior rigid section.

Another example embodiment includes a method of manufacturing a spatula. The method may include selecting a cylindrical container. The cylindrical container includes a container height and a container internal diameter. The container height is measured from an internal bottom surface to a rim of the cylindrical container. The method may also include constructing a spatula sized to remove product from the cylindrical container. The spatula includes a blade having a blade perimeter. The blade perimeter includes a first blade end, a second blade end opposite the first blade end, and two blade sides substantially perpendicular to the first blade end and the second blade end. The blade also includes a peripheral flexible edge along the second blade end and the two blade sides. The peripheral flexible edge has material properties allowing elastic deformation under stress. The blade also includes a blade width that is greater than the container internal diameter. The peripheral flexible edge along the two blade sides is configured to deform to contact an internal surface of the cylindrical container.

Another example embodiment includes a method of removing product from a container with a spatula. The method may include orienting a blade of the spatula with respect to the cylindrical container containing product such that a blade width is substantially oriented across a diameter of the cylindrical container. The method may also include inverting the cylindrical container. The method may also include inserting the blade through the product such that a second blade end that includes a flexible straight edge contacts an internal bottom surface of the cylindrical container and two flexible opposing edges deform against an internal surface along two contact lengths of the cylindrical container. The two flexible opposing edges are curved in opposing directions. The method may also include rotating the blade such that the product contacts the curves on a positively curved surface of the two flexible opposing edges and the two flexible opposing edges make continuous contact with the internal surface of the container.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

It is to be understood that both the foregoing general description and the following detailed description are exemplary and explanatory and are not restrictive of the invention, as claimed.

BRIEF DESCRIPTION OF THE DRAWINGS

To further clarify the above and other advantages and features of some embodiments, a more particular description will be rendered by reference to specific embodiments thereof which are illustrated in the appended drawings. It is appreciated that these drawings depict only typical embodiments and are therefore not to be considered limiting of its scope. The invention will be described and explained with additional specificity and detail through the use of the accompanying drawings in which:

FIGS. 2A-2C illustrate planar views of the spatula of FIG. 1;

FIG. 3A illustrates a sectional view of the spatula of FIG. 1;

FIG. 3B illustrates a detailed view of a flexible opposing edge of the spatula of FIG. 1;

DESCRIPTION OF EMBODIMENTS

Some example embodiments relate to a spatula for removing product from a container. The spatula includes a handle attached to a blade at a first blade end. An interior rigid section extends from the first blade end and is surrounded along a second blade end and two blade sides by a peripheral flexible edge. When the spatula is inserted into the container, the peripheral flexible edge contacts an internal surface and an internal bottom surface of the container. A blade height may be greater than a container height of the container, exposing a portion of the blade above a rim of the container. As the spatula is rotated, the peripheral flexible edge maintains contact with the internal surface and the internal bottom surface of the container, making removal of product stored within the container efficient and effective.

Figure 1:
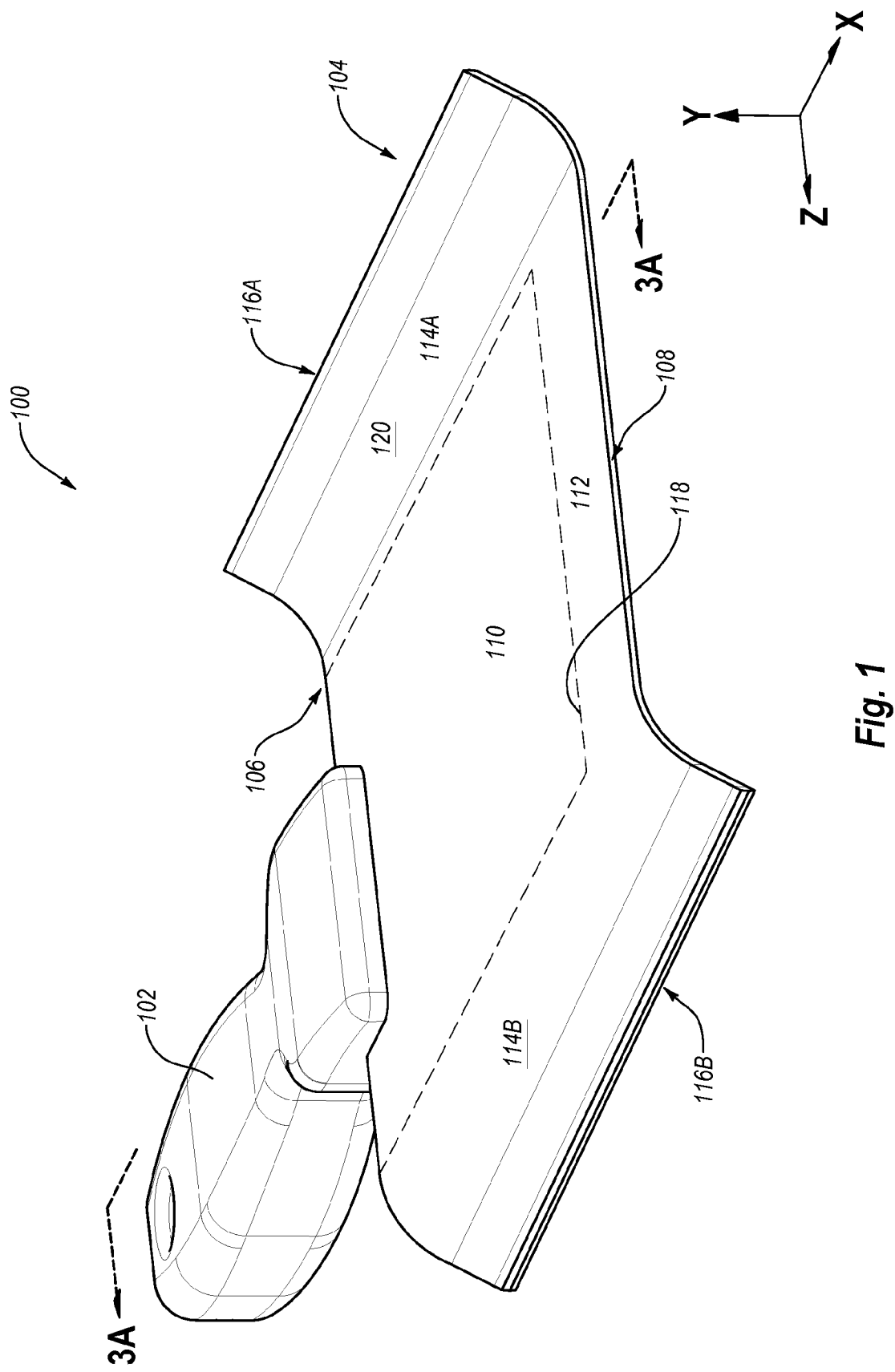
FIG. 1 illustrates an example spatula.

FIG. 1 illustrates an example spatula 100. The spatula 100 may be sized to remove product from a container, for instance. The spatula 100 may generally include a handle 102 attached to a blade 104. The blade 104 may generally be placed in contact with products such as liquid or aqueous foodstuff to displace or otherwise manipulate the products. The handle 102 may be attached to a first blade end 106 of the blade 104. For example, the first blade end [104] 106 may be inserted into a receiving portion of the handle 102 and subsequently secured as with a rivet, an adhesive, or some other fastener. Securely attaching the handle 102 and the first blade end 106 may enable forces applied to the handle 102 to transfer to the blade 104. Thus, the handle 102 may enable a user to grip and use the spatula 100. For example, the handle 102 may enable application of rotation forces to the blade 104 through the handle 102.

In alternative embodiments, the spatula 100 may omit the handle 102. In these and other embodiments, the blade 104 may be coupled or otherwise attached to another mechanism such as an automated system that applies forces to the blade 104.

The blade 104 may include a blade perimeter. In the embodiment depicted in FIG. 1, the blade perimeter may include the first blade end 106, a second blade end 108, a first blade side 116A, and a second blade side 116B (generally, the first blade side 116A and the second blade side blade side 116B are referred to herein as "blade side 116" or "blade sides 116"). The second blade end 108 may be positioned opposite the first blade end 106. Additionally, the two blade sides 116 may be perpendicular or substantially perpendicular to the first blade end 106 and the second blade end 108. For example, the blade 104 may generally have a rectangular cross section with the blade perimeter, (i.e. the first blade end 106, the second blade end 108, and the blade sides 116) forming the boundaries of the rectangular cross section.

The blade 104 may also include a peripheral flexible edge 120 and an interior rigid section 110. As used herein, flexible relates to elastic deformation under stress. Accordingly, the peripheral flexible edge 120 includes an edge composed of a material having material properties that allow elastic deformation under stresses as described herein. Additionally, flexible may be a relative term. For example, the peripheral flexible edge 120 may be composed of a material that allows greater deformation than the interior rigid section 110 under the same stress. Accordingly, the interior rigid section 110 may be composed of a second material or the same material having different material properties due to treatment, processing, coatings, etc.

In this and other embodiments, the interior rigid section 110 encompasses a portion of the blade 104 other than the peripheral flexible edge 120. The peripheral flexible edge 120 may be located along the second blade end 108 and the two blade sides 116. The peripheral flexible edge 120 may include a flexible straight edge 112 and two flexible opposing edges 114A and 114B (generally, the two flexible opposing edges 114A and 114B are referred to herein as "flexible opposing edge 114" or "flexible opposing edges 114"). The flexible straight edge 112 may be located along the second blade end 108. The flexible opposing edges 114 may be located along the blade sides 116. In the depicted embodiment, the flexible opposing edges [116] 114 extend from the first blade end 106 to the second blade end 108 and the flexible straight edge 112 extends between the first blade side 116A and the second blade side 116B. However, this depiction is not meant to be limiting. In some embodiments, the flexible opposing edges 114 may include some portion of a length between the first blade end 106 and the second blade end 108 and/or the flexible straight edge 112 may include some portion of a length between the first blade side 116A and the second blade side 116B.

The two flexible opposing edges 114 may be curved. More specifically in some embodiments, the two flexible opposing edges 114 may be curved in opposing directions. For example, in FIG. 1, a first flexible opposing edge 114A is curved such that the first blade side 116A extends towards a substantially positive y-direction. A second flexible opposing edge 114B is curved such that the second blade side 116B extends towards a substantially negative y-direction.

In some embodiments, the flexible straight edge 112 and the two flexible opposing edges 114 may be one integrated piece. Alternatively, the flexible straight edge 112 and the two flexible opposing edges 114 may be independent components, which may be composed of differing materials with differing flexibilities, and subsequently attached or combined.

In FIG. 1, a dashed line 118 is included to indicate an inner boundary of the peripheral flexible edge 120 and an outer boundary of the interior rigid section 110. In some embodiments, the dashed line 118 may correspond to or indicate a change in material, a change in relative flexibility, a surface where components are affixed, or any combination thereof. For example, the interior rigid section 110 may be one integrated piece with the flexible straight edge 112 and/or the two flexible opposing edges 114. Accordingly, the dashed line 118 may indicate a change in relative flexibility. Alternatively, the interior rigid section 110 may be composed of a first material and the peripheral flexible edge 120 may be composed of a second material. The interior rigid section 110 and the peripheral flexible edge 120 may be attached to form the blade 104. In this and other embodiments, the dashed line 118 may indicate where the interior rigid section 110 is affixed to the peripheral flexible edge.

In the configuration depicted in FIG. 1, the interior rigid section 110 includes the first blade end 106. Additionally, the interior rigid section 110 extends from the first blade end 106 towards the second blade end 108. The interior rigid section 110 is surrounded by the peripheral flexible edge 120 along the second blade side 108 and the blade sides 116.

The interior rigid section 110 may provide support for the spatula 100 when forces are applied by the user. For example, the interior rigid section 110 may aid in maintaining the rectangular cross-section of the blade 104 when rotational forces are applied. Additionally, the interior rigid section 110 may be configured to be rigid enough such that during rotation of the blade 104, the blade 104 does not substantially flex as compared to the peripheral flexible edge. Instead, the majority of or all of the rotation forces are transferred to the product by the interior rigid section 110. Thus, a specific rigidity of the interior rigid section 110 may be based on the product being manipulated by the spatula 100 and/or the expected forces imposed thereon.

The portion of the blade 104 encompassed by the interior rigid section 110 may vary. In some embodiments, the interior rigid section 110 may encompass a majority of the blade 104. In alternative embodiments, a smaller portion of the blade 104 may include the interior rigid section 110, the blade 104 may include additional sections with varying rigidities, or the blade 104 may not include an interior rigid section 110. The specifications of the portion of the blade 104 encompassed by the interior rigid section 110 may be based on an expected product for manipulation by the spatula 100 and/or the expected forces imposed thereon.

FIGS. 2A-2C illustrate planar views of the spatula 100 of FIG. 1. Specifically, FIG. 2A depicts the spatula 100 in an xz plane, FIG. 2B depicts the spatula 100 in an xy plane, and FIG. 2C depicts the spatula 100 in an yz plane. Note, the specific orientation of the xyz coordinate system including herein is arbitrarily defined.

Referring to FIGS. 2A-2C, a central longitudinal axis 202 of the spatula 100 is illustrated. In FIGS. 2A and 2B, the central longitudinal axis 202 is depicted on an exterior surface of the spatula 100. However, the central longitudinal axis 202 is meant to represent an internal axis of the spatula 100 as depicted in FIG. 2C. Multiple components (100, 116A, 116B, 108, 104, 112, 110, 114A, 114B, 118, 106, and 102) of the spatula 100 are referenced in FIGS. 2A-2C. These components were described with reference to FIG. 1, and the description is not repeated here.

In FIGS. 2A-2C, a blade height 206 (FIGS. 2A and 2B), a blade width 204 (FIGS. 2A and 2C), and a handle height 208 (FIGS. 2A and 2B) are depicted. The blade height 206 includes a dimension between the first blade end 106 and the second blade end 108. The blade height 206 includes the flexible straight edge 112 and accordingly may change when the flexible straight edge 112 is compressed or deformed. The blade width 204 includes a dimension between the first blade side 116A and the second blade side 116B. Similar to the blade height 204, the blade width 206 includes the flexible opposing edges 114. Accordingly, the blade width 206 may change when one or more of the flexible opposing edges 114 are compressed or deformed. The handle height 208 includes a dimension between a first handle end 210 and a second handle end 212. In some embodiments, the handle height 208 may include a receiving portion 214 of the handle 102 into which the blade 104 is inserted.

The blade height 206, the blade width 204, and the handle height 208 may be sized in accordance with a particular application of the spatula 100. For example, the spatula 100 may be used for removal of product from a container, such as a standard cylindrical container. Thus, the blade width 204 and/or the blade height 206 may be greater than or equal to a container internal diameter and/or a container height, respectively of the standard cylindrical container. Likewise, the handle height 208 may be sized to separate a user's hand from the product as it is removed from the standard cylindrical container. Some additional details of sizing the blade 104 and the handle 102 are provided below.

With specific reference to FIG. 2A, in the xz plane the spatula 100 includes a substantially rectangular cross-section with a perimeter including the first blade end 106, the second blade end 108, and the two blade sides 116. In this and other embodiments, the two flexible opposing edges 114 extend along the entire two blade sides 116. Accordingly, heights of the two flexible opposing edges 114 may be equal to the blade height 206. In alternative embodiments, the cross-section of the blade 104 may be another shape. For example, the blade width 204 may decrease between the first blade end 106 and the second blade end 108.

The central longitudinal axis 202 may bisect the blade 104. In these and other embodiments, the blade 104 may therefore be rotationally symmetric with respect to the central longitudinal axis 202. The curves of the two flexible opposing edges 114 are oriented in opposing directions, but may be substantially identical. Additionally, the handle 102 may be oriented along the central longitudinal axis 202. In some embodiments, the central longitudinal axis 202 may bisect the handle 102.

With reference to FIG. 2C, a general transverse shape of the blade 104 is illustrated in the yz-plane. In this and other embodiments, the two flexible opposing edges 114 curve in opposing directions forming generally an elongated S-shaped transverse profile. More specifically, the first flexible opposing edge 114A includes a positive curvature and the second flexible opposing edge 114B includes a negative curvature.

Additionally, in some embodiments, the two flexible opposing edges 114 may be rotationally symmetric with respect to the central longitudinal axis 202. Specifically, the first flexible opposing edge 114A may be substantially identical to the second opposing edge 114B other than the orientation of the curve (i.e. positive vs. negative curvature).

FIG. 3A illustrates a sectional view 300 of the spatula 100 of FIG. 1. Multiple components (100, 108, 104, 106, and 102) of the spatula 100 are referenced in FIG. 3A. These components were described with reference to FIG. 1, and the description is not repeated here. With combined reference to FIGS. 1 and 3, the sectional view in FIG. 3A depicts the spatula 100 sectioned along a plane that is parallel to the xy-plane. The plane is depicted with dashed arrows labeled 3A in FIG. 1.

Referring back to FIG. 3A, the sectional view illustrates one or more blade thicknesses 310A or 310B (generally, blade thickness 310). Generally, the blade thickness 310 includes a dimension between a first blade surface 314 and a second blade surface 316. The blade thickness may be substantially smaller than the blade height 206 and the blade width 204 as illustrated in FIGS. 2A and 2C.

The blade thickness 310 may vary. For example, the blade 104 may include a first blade thickness 310A and a second blade thickness 310B. The first blade thickness 310A may be the distance between the first blade surface 314 and the second blade surface 316 at the first blade end 106. The second blade thickness 310B may be a dimension between the first blade surface 314 and the second blade surface 316 at the second blade end 108. In this and other embodiments, the second blade thickness 310B may be less than the first blade thickness 310A. For example, in some embodiments, the blade thickness 310 may vary linearly between the first blade end 106 and the second blade end 108. Additionally, the blade thickness 310 may be constant along the blade width.

With combined reference to FIGS. 1, 2A, and 3A, in some embodiments, the interior rigid section 110 may have a first constant blade thickness along the blade width and the peripheral flexible edge 120 may have a second constant blade thickness. Alternatively, in some embodiments, the blade thickness 310 may be constant between the first blade end 106 and the second blade end 108. In these and other embodiments, the blade thickness 310 may be composed of a less flexible material and/or may have an overall lower blade thickness.

FIG. 3B illustrates a detailed view of a flexible opposing edge 114 of the spatula 100 of FIG. 1. Multiple components (110, 116, and 114) of the spatula 100 are referenced in FIG. 3B. These components were described with reference to FIG. 1, and the description is not repeated here. The flexible opposing edge 114 generally includes a portion of the blade 104 from an edge of the interior rigid section 110 to one of the blade sides 116. The flexible opposing edge 114 may be curved creating a positively curved surface 302 and a negatively curved surface 306.

FIG. 3B also includes product 312. The product 312 may include any substance such as a fluid or aqueous foodstuff. In the embodiment depicted in FIG. 3B, when the spatula 100 including the flexible opposing edge 114 is rotated clockwise, the positively curved surface 302 may contact the product 312. The positively curved surface 302 may generate a scooping or lifting force on the product 312. Alternatively, when the spatula 100 including the flexible opposing edge 114 is rotated counterclockwise, the negatively curved surface 306 may contact the product 312. The negatively curved surface 306 may not generate the scooping or lifting force on the product 312.

Figure 4A:
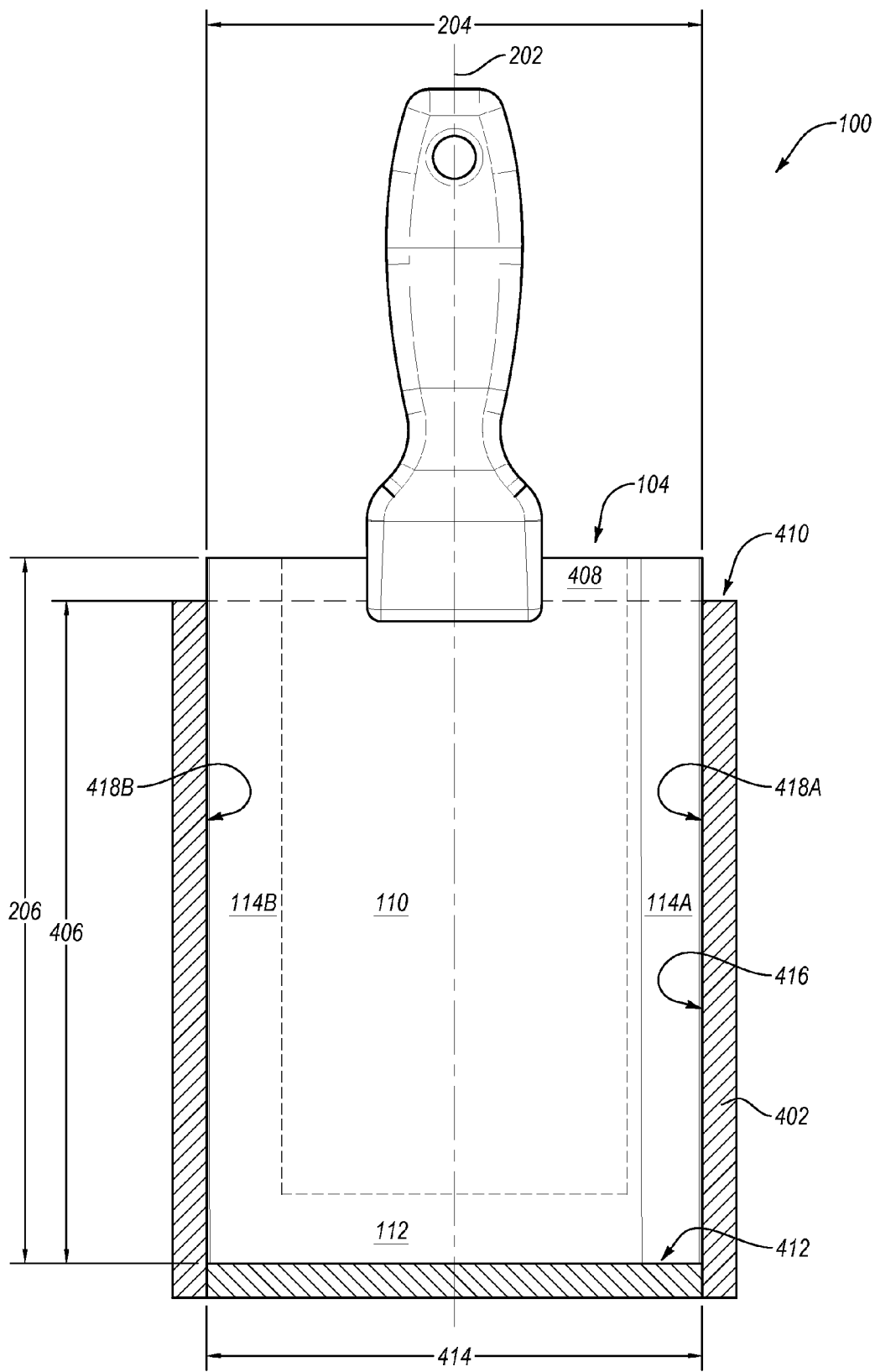
FIGS. 4A and 4B illustrate the spatula of FIG. 1 inserted in a container.
Figure 4B:
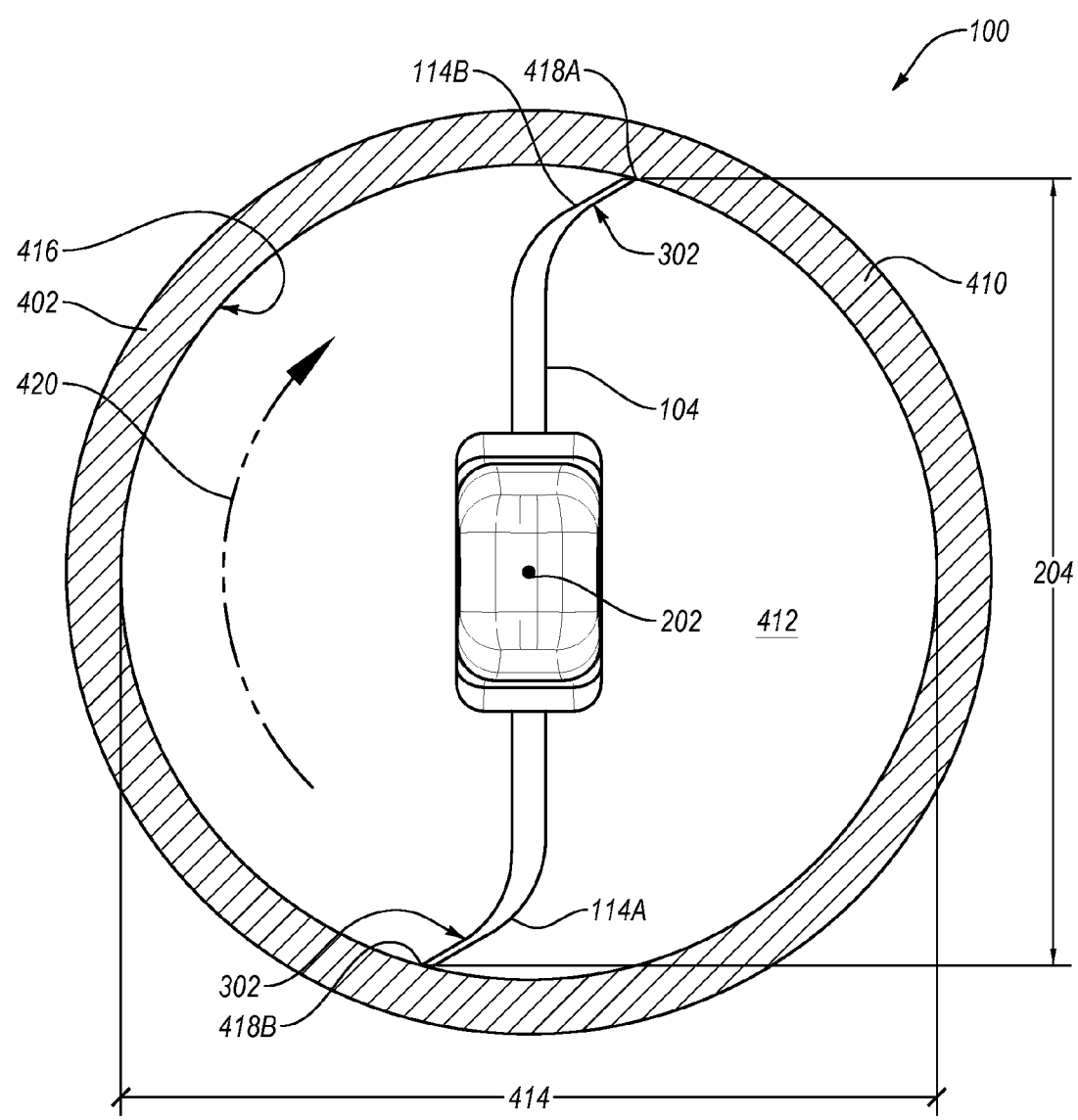

FIGS. 4A and 4B illustrate the spatula 100 of FIG. 1 inserted in a container 402. Multiple components (100, 108, 110, 112, 114A, 114B, 104, 106, 102, 206, 202, 204, and 302) of the spatula 100 are referenced in FIGS. 4A and 4B. These components were described with reference to FIGS. 1, 2A-2C, 3A, and 3B, and the description is not repeated here. Specifically, FIG. 4A illustrates a cross-sectional view of the container 402 with the spatula inserted therein. The cross sectional view of the container in FIG. 4A may be made across the diameter of the container 402, for instance. FIG. 4B illustrates a top view of the spatula 100 inserted in the container 402.

Generally, the blade 104 and/or the handle 102 of the spatula 100 may be sized in accordance with one or more dimensions of the container 402. By sizing the blade 104 according to the dimensions of the container 402, the removal of product (not shown) from the container 402 may be efficient and accordingly less time consuming.

The container 402 may include a container height 406. The container height 406 may include a dimension between an internal bottom surface 412 and a rim 410. The container 402 may also include a container internal diameter 414. Internal surfaces of the container 402 may include an internal surface 416 and the internal bottom surface 412. The internal surface 416 includes an elongated ring with a diameter equal to the container internal diameter 414 and a height equal to the container height 406. The internal surface 416 may include contact lengths 418A and 418B. The contact lengths 418A and 418B designate lines on the internal surface 416 at which the blade sides 116 contact the internal surface 416 when the spatula 100 is inserted into the container 402. The internal bottom surface 412 may include a disc having a diameter equal to the container internal diameter 414. The internal bottom surface 412 may be located opposite the rim 410.

In this and other embodiments, the blade height 206 may be greater than or about equal to the container height 406. When the blade height 206 is greater than the container height 406, an exposed portion 408 of the blade 104 may extend above the rim 410 of the container 402 when the flexible straight edge 112 (i.e. the second blade end 108) is in contact with the internal bottom surface 412 of the container 402.

Having the blade height 206 greater than the container height 406 may provide some functional benefits. For example, during removal of product from the container 402, the exposed portion 408 of the blade 104 that extends above the rim 410 may continue to direct product after the product is initially displaced from the container 402. Additionally or alternatively, the exposed portion 408 of the blade 104 that extends above the rim 410 may ensure that all of the product in the container 402 is removed, even the product located towards the rim 410.

The blade width 204 may also be greater than or about equal to the container internal diameter 414. The two flexible opposing edges 114 may thus contact the internal surface 416 along the contact lengths 418A and 418B. The difference between the blade width 204 and the container internal diameter 414 may result in the flexible opposing edges 114 being deformed to fit within the container 402. Some functional benefits of the flexible opposing edges 114 being deformed to fit within the container 402 may include a tight interference between the blade 104 and the internal surface 416. With the tight interference between the blade 104 and the internal surface 416, the product may be efficiently removed from the container 402.

Two non-limiting examples of the container 402 may include a #10 standard can and a #5 standard can. The #10 standard can has an overall height of about 7 inches and an outer diameter of about 6.125 inches. Thus, a container height 406 of the #10 standard can may be about 6.875 inches and a container internal diameter 414 of the #10 standard can may be about 5.875 inches. Note, the container height 406 and/or the container internal diameter 414 of the #10 standard can may depend on the thickness of the #10 standard can. Accordingly, a blade height 206 of a spatula 100 constructed for a #10 standard can may be about 8.25 inches and a blade width 204 may be about 6 inches.

Likewise, regarding the #5 standard can, the #5 standard can has an overall height of about 5.625 inches and an outer diameter of about 5.125 inches. Thus, a container height 406 of the #5 standard can may be about 5.5 inches and a container internal diameter 414 may be about 4.875 inches. Note, like the #10 standard can, the container height 406 and/or the container internal diameter 414 of the #5 standard can may depend on the thickness of the #5 standard can. Accordingly, the blade height 206 of a spatula 100 constructed for a #5 standard can may be about 6.875 inches and a blade width 204 may be about 5 inches.

In some embodiments, the blade 104 may be inserted through the product within the container 402. Specifically, the blade 104 may be inserted such that the second blade end 108 including a flexible straight edge 112 contacts the internal bottom surface 416 of the container 402. Additionally, the two flexible opposing edges 114 may deform against the internal surface 416 along the two contact lengths 418A and 418B. The blade 104 may be inserted oriented such that the blade width 204 is substantially oriented across a container internal diameter 414.

The spatula 100 may be rotated about the central longitudinal axis 202 to remove product from the container 402. Additionally, the container 402 may be inverted or partially inverted such that gravity assists in removing the product from the container. During rotation of the spatula 100, the two flexible opposing edges 114 may maintain contact with the internal surface 416 of the container 402. Thus, the spatula 100 may contact an entire internal volume of the container 402 through a rotation of 180 degrees.

With specific reference to FIG. 4B, a direction of rotation of the spatula 100 may be indicated by arrow 420. The arrow 420 may be oriented such that the positively curved surfaces 302 of the flexible opposing edges 114, discussed with reference to FIG. 3B, generate a scooping or lifting force against the product along the internal surface 416 of the container 402. As the spatula 100 is rotated in the direction of the arrow 420, the flexible opposing edges 114 displace product from the internal surface 416 and the interior rigid section 110 displaces the product from the internal volume of the container 402. Additionally, the flexible straight edge 112 contacts the internal bottom surface 412 to displace the product from the internal bottom surface 412.

Figure 5:
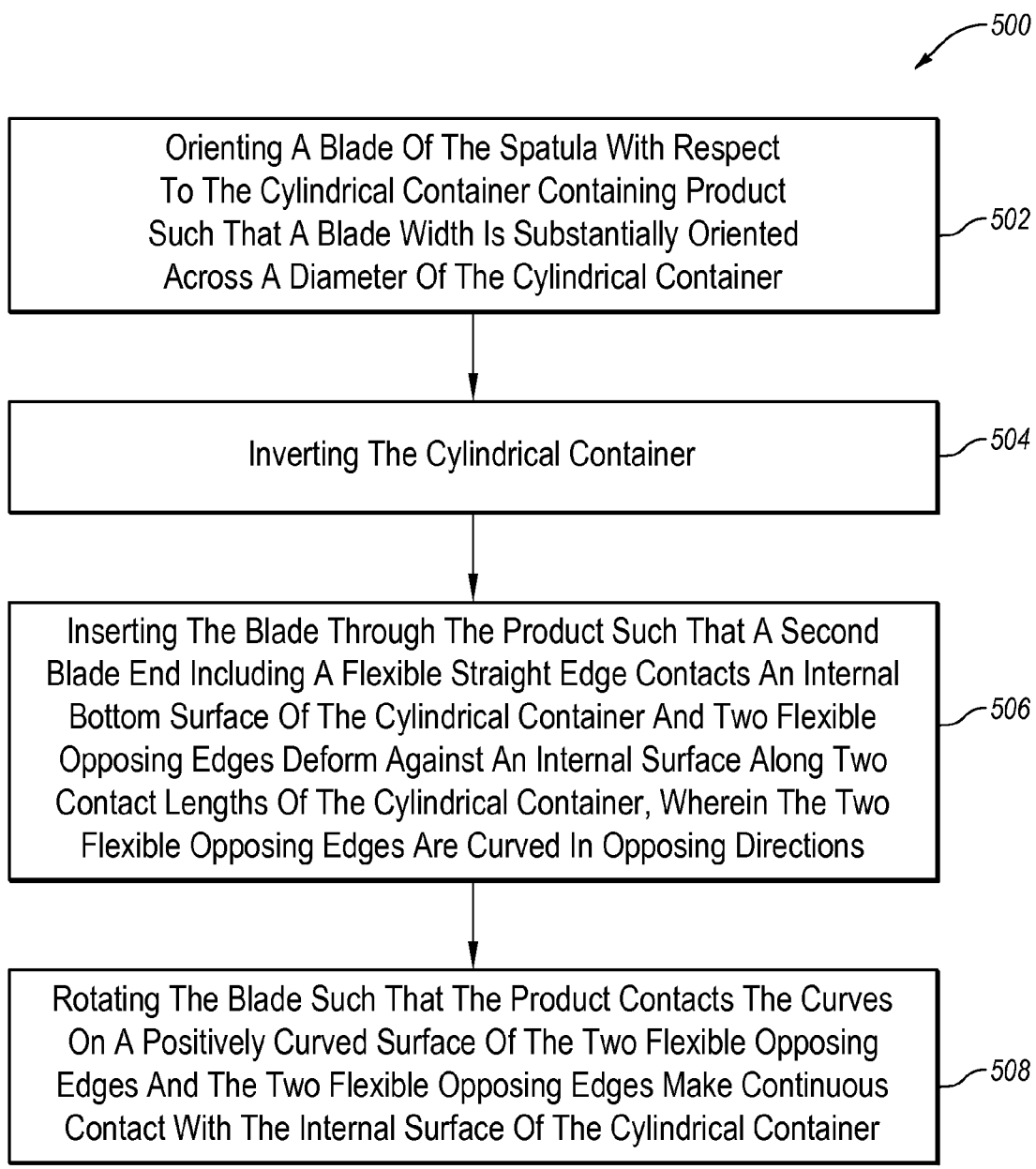
FIG. 5 is a flow chart illustrating an example method of removing product from a container with a spatula that may be implemented by the spatula of FIG. 1.

FIG. 5 is a flow chart illustrating an example method 500 of removing product from a container with a spatula. The method 500 may be implemented by the spatula 100 of FIG. 1 in some embodiments. One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

The method 500 may begin at block 502 with orienting a blade of the spatula with respect to the container. The blade may be oriented such that a blade width is substantially oriented across a container internal diameter.

At block 504, the method 500 may include inverting the container. Alternatively, the container may be partially inverted. By inverting or partially inverting the container, gravity may assist in removing the product from the container.

At block 506, the method 500 may include inserting the blade through the product. The blade may be inserted such that a second blade end contacts an internal bottom surface of the container. In some embodiments, the second blade end may include a flexible straight edge. Additionally, the blade may be inserted such that two flexible opposing edges deform against an internal surface along two contact lengths of the container. The two flexible opposing edges may be curved in opposing directions.

At block 508, the method 500 may include rotating the blade. The blade may be rotated such that the product contacts positively curved surfaces of the two flexible opposing edges. Additionally, the blade may be rotated such that the two flexible opposing edges make continuous contact with the internal surface of the container.

In some embodiments, when the flexible straight edge contacts the internal bottom surface, an exposed portion of the blade extends from a rim of the container. Additionally, in some embodiments, the blade includes an interior rigid section that encompasses a portion of the blade other than the flexible straight edge and the two flexible opposing edges.

The present invention may be embodied in other specific forms without departing from its spirit. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A spatula comprising:
a handle; and
a blade having a rectangular cross section, wherein the blade includes:
a first blade end at which the blade is attached to the handle,
an interior rigid section that extends from the first blade end, wherein the interior rigid section includes a rectangular transverse profile and is composed of a first material,
a second blade end that is opposite the first blade end,
two blade sides that are substantially perpendicular to the first blade end and the second blade end, and
a peripheral flexible edge that extends along the second blade end and the two blade sides, wherein the peripheral flexible edge is composed of a second material that deforms under less stress than the interior rigid section and portions of the peripheral flexible edge that extend along the two blade sides form two flexible opposing edges that are substantially perpendicular to the first blade end and the second blade end and are curved in opposing directions with respect to a central longitudinal axis of the blade to form an S-shaped profile.

2. The spatula of claim 1, wherein the blade further includes a blade thickness that is substantially constant along a blade width between the two blade sides and decreases along a blade height from the first blade end to the second blade end.

3. The spatula of claim 2, wherein:
the blade thickness linearly decreases from the first blade end to the second blade end, and
the blade thickness is substantially less than the blade height and the blade width.

4. The spatula of claim 1, wherein:
a first edge of two flexible opposing edges extends along an entire first blade side,
a second edge of the two flexible opposing edges extends along an entire second blade side,
heights of the first edge and second edge are about equal to a blade height, and
the blade height including a dimension measured from the first blade end to the second blade end.

5. The spatula of claim 1, wherein:
a first of the portions of the peripheral flexible edge that extend along the two blade sides includes a positive curvature and
a second of the portions of the peripheral flexible edge that extend along the two blade sides includes a negative curvature, and
the positive curvature and the negative curvature are substantially equivalent other than the direction of curvature.

6. The spatula of claim 1, wherein the two flexible opposing edges are rotationally symmetric with respect to the central longitudinal axis of the blade.

7. The spatula of claim 1, wherein the blade is rotationally symmetric with respect to the central longitudinal axis of the spatula and the interior rigid section is symmetric with respect to a plane perpendicular to a first surface of the blade that intersects the central longitudinal axis.

8. The spatula of claim 1, wherein the interior rigid section is one integrated piece with the flexible straight edge and the peripheral flexible edge.

9. A spatula comprising:
a handle; and
a blade having a rectangular cross section, wherein the blade includes:
a first blade end at which the blade is attached to the handle, an interior rigid section that extends from the first blade end, wherein the interior rigid section includes a rectangular transverse profile and is composed of a first material, a flexible straight edge that extends along a second blade end that is opposite the first blade end, wherein the flexible straight edge deforms under less stress than the interior rigid section, two blade sides that are substantially perpendicular to the first blade end and the second blade end, two flexible opposing edges that are substantially perpendicular to the first blade end and the second blade end, wherein the two flexible opposing edges are curved in opposing directions forming an S-shaped transverse profile and deform under less stress than the interior rigid section, a peripheral flexible edge, including the flexible straight edge and the two flexible opposing edges, along the second blade end and the two blade sides, the peripheral flexible edge composed of a second material that deforms under less stress than the interior rigid section, and a blade thickness that is substantially constant along a blade width between the two flexible opposing edges and decreases along a blade height from the first blade end to the second blade end.

10. The spatula of claim 9, wherein the peripheral flexible edge is sized to correspond to a particular cylindrical container such that when the spatula is inserted in the particular cylindrical container with the blade width substantially oriented across a diameter of the cylindrical container, the peripheral flexible edge is compressed to fit within the cylindrical container and to maintain contact with an internal surface of the cylindrical container.

11. The spatula of claim 9, wherein the interior rigid section is flat and is bordered by the two flexible opposing edges, wherein a first of the two flexible opposing edges is parallel to a second of the two flexible opposing edge and encompasses an approximately equal portion of a blade surface as the second flexible opposing edge.

12. The spatula of claim 9, wherein the flexible straight edge can be compressed such that the blade height changes.

13. The spatula of claim 9, wherein the blade height is sized to be greater than a container height of a corresponding cylindrical container, such that an exposed portion of the blade extends above a rim of the corresponding cylindrical container when the second blade end is in contact with an internal bottom surface of the corresponding cylindrical container.

14. The spatula of claim 9, wherein the two flexible opposing edges and the flexible straight edge each encompass a portion of a surface of the blade.

15. The spatula of claim 9, wherein the peripheral flexible edge and the interior rigid section together encompass an entire surface of the blade.

16. The spatula of claim 15, wherein the peripheral flexible edge encompasses two approximately equal portions of the blade width.

17. The spatula of claim 9, wherein the first blade end is continuous and each portion of the first blade end is located an equal distance from the second blade end.

18. The spatula of claim 10, wherein the peripheral flexible edge is sized to correspond to a No. 300 cylinder.

19. A spatula sized to correspond to a cylindrical container that is substantially compliant with a No. 300 container, the spatula comprising:

a blade having a rectangular cross section that is rotationally symmetric about a longitudinal axis, the blade including:

an interior rigid section that is composed of a first material, the interior rigid section spanning from a first blade end to a second blade end and from a first blade side to a second blade side;

a peripheral flexible edge extending along the second blade end, the first blade side, and the second blade side, wherein the peripheral flexible edge includes a flexible straight edge that extends from the second blade end and two flexible opposing edges having an S-shaped profile that extend from the first blade side and the second blade side, and the peripheral flexible edge is composed of a second material that deforms under less stress than the first material;

a blade height that is sized to be greater than a container height of the cylindrical container such that when the spatula is inserted in the cylindrical container and the flexible straight edge is in contact with an internal bottom surface of the cylindrical container, an exposed portion of the blade extends above a rim of the cylindrical container;

a blade width defined from a first of the flexible opposing edges to a second of the flexible opposing edges and sized to correspond to a diameter of the cylindrical container such that when the spatula is inserted in the cylindrical container with the blade width substantially oriented across the diameter, the peripheral flexible edge compresses to fit against an internal surface of the cylindrical container and maintain contact with an internal surface of the cylindrical container as the spatula is rotated substantially about the longitudinal axis; and a blade thickness that is substantially constant along the blade width and decreases along the blade height from the first blade end to the second blade end; and a handle that is fastened to the blade at a first blade end.

* * * * *